Sept. 20, 1966  TOSHIO KURIMURA ET AL  3,274,479
RECTIFYING APPARATUS FOR PRODUCING CONSTANT VOLTAGE
Filed Oct. 15, 1962  7 Sheets-Sheet 1
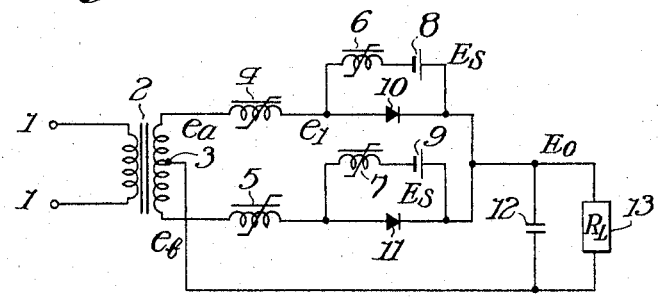
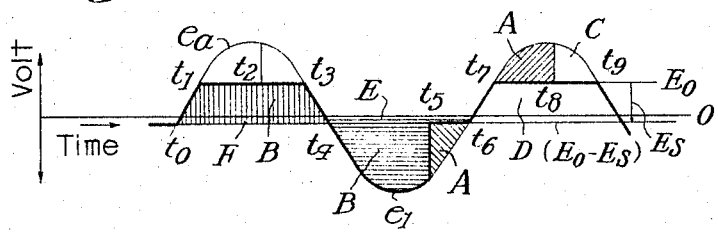
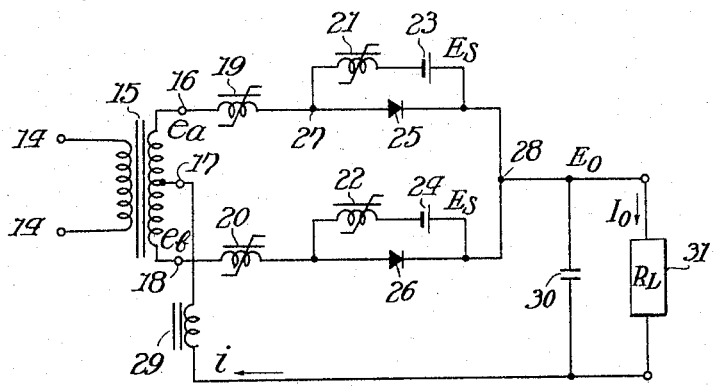

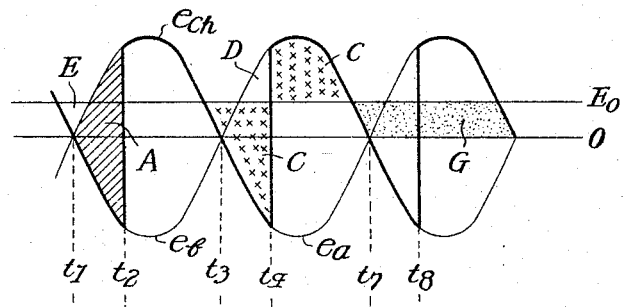
Fig-4A
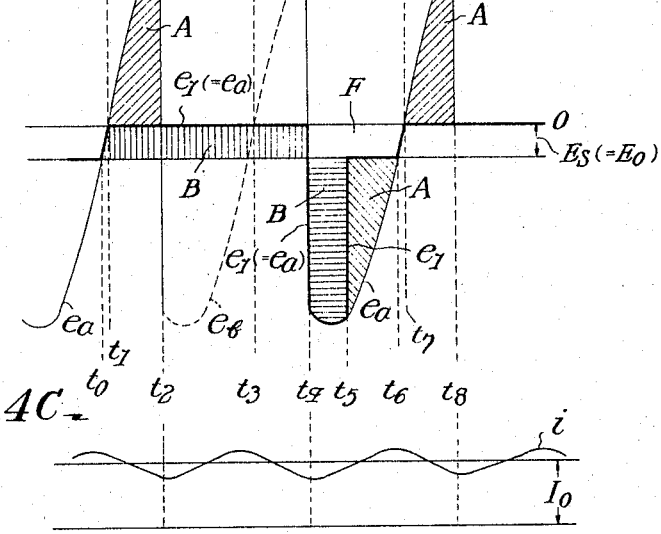
Fig-4B
Fig-4C
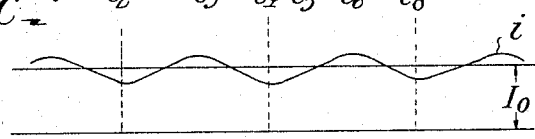
Fig-9B
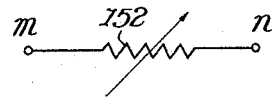

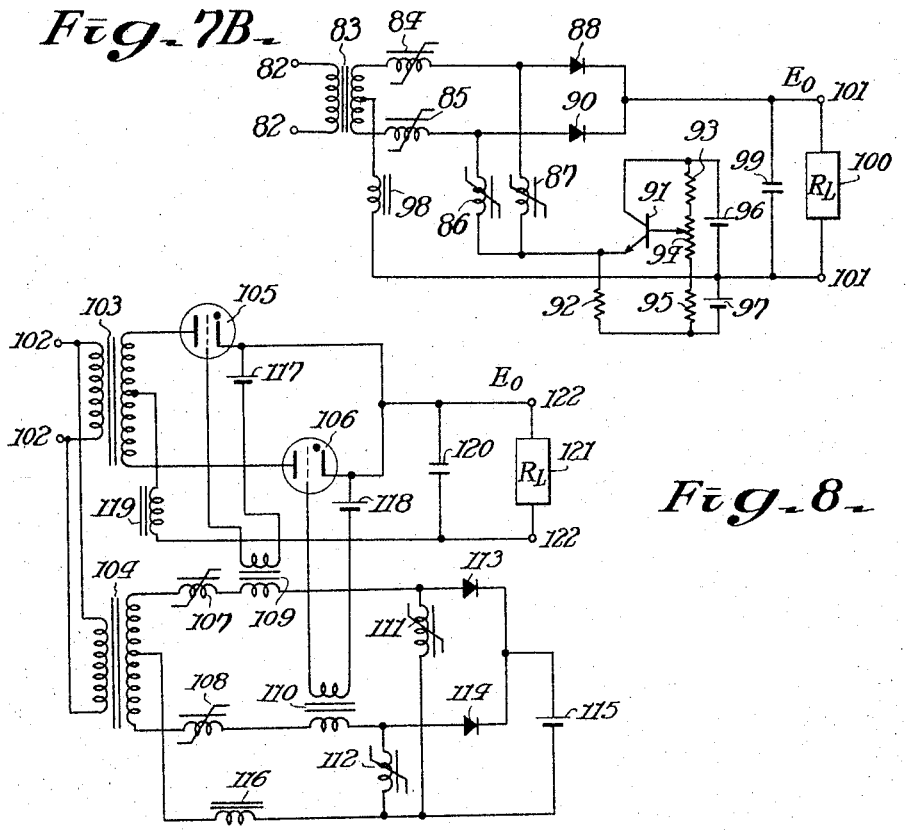
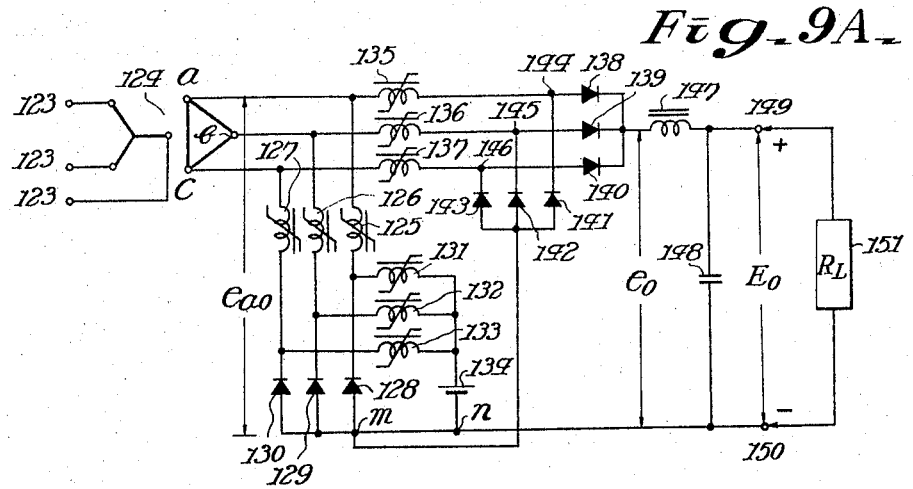

United States Patent Office 3,274,479
Patented Sept. 20, 1966

3,274,479
RECTIFYING APPARATUS FOR PRODUCING
CONSTANT VOLTAGE
Toshio Kurimura, Setagaya-ku, Tokyo-to, and Kazuomi
Yamamura, Yoyogi, Shibuya-ku, Tokyo-to, Japan, assignors to Kokusai Denshin Denwa Kabushiki Kaisha,
Tokyo, Japan
Filed Oct. 15, 1962, Ser. No. 230,534
Claims priority, application Japan, Oct. 23, 1961,
36/37,984
10 Claims. (Cl. 321—25)

This invention relates to a rectifying apparatus and more particularly to a rectifying apparatus for producing substantially constant voltage using saturatable reactors.

In general, the D.C. output voltage of a rectifying apparatus varies in accordance with the voltage of the input A.C. Therefore, when it is necessary to maintain the D.C. output voltage at a constant value, such methods as taking measures to stabilize the A.C. input voltage, or accomplishing a so-called feedback control after rectification, to maintain the D.C. output voltage constant are resorted to. However, the means heretofore available for carrying out such methods have had one or more of numerous disadvantages such as, for example: complicated and high-priced apparatus are required; low response speed whereby abrupt fluctuations in the input voltage appear in the D.C. output voltage; a narrow range of applicable voltage; and difficulty in obtaining a rectifying apparatus of large capacity.

It is, therefore, an object of the present invention to provide a new rectifying apparatus for producing a constant voltage which has an extremely high response time to compensate fluctuations in a wide range of A.C. input voltages in order to develop stable D.C. output voltages.

It is another object of the invention to provide a rectifying apparatus which has the capacity of rectifying, with ease, large power A.C. voltages.

Another important object of the invention is to provide a rectifying apparatus for producing constant voltages which, when used for full-wave rectification of A.C. power, has the characteristic of maintaining the D.C. output voltage in a stable state even if fluctuations exist in the load current.

The novel features of the present invention are set forth with particularity in the appended claims. The invention itself, however, both as to its manner of construction and operation, together with other objects and advantages thereof, may be best understood by reference to the following detailed description taken in conjunction with the accompanying drawings, in which:

FIGS. 1 and 3 are circuit diagrams showing embodiments of the rectifying apparatus according to the invention applied to half-wave rectification (rectification with utilization of a center tap in the power-source transformer) of two-phase A.C. power;

FIGS. 2 and 4A, 4B and 4C are waveform diagrams illustrating the operation of the embodiments shown in FIGS. 1 and 3 respectively;

Figure 7A:
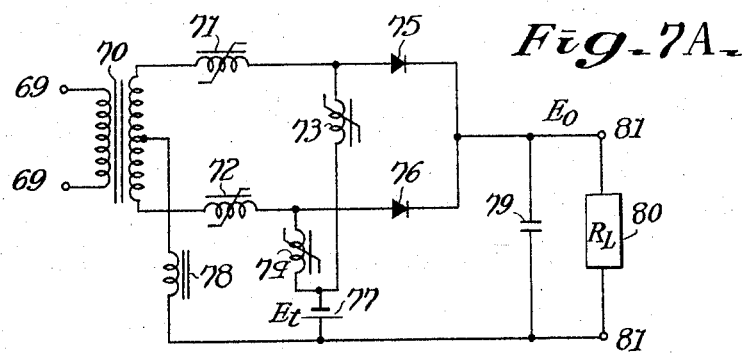
Figure 10A:
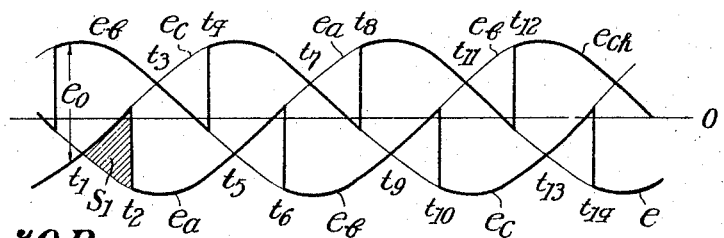
Figure 10B:
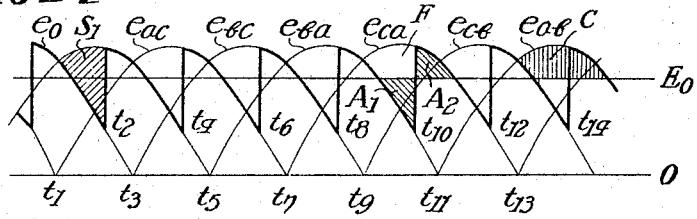
Figure 10C:
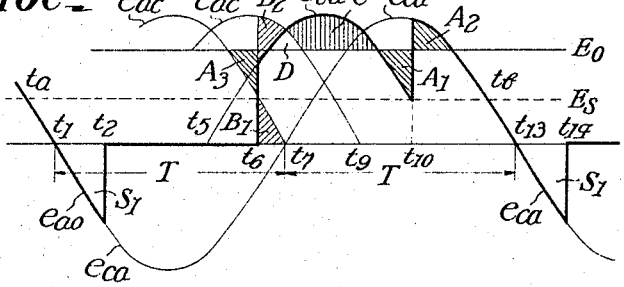
Figure 14:
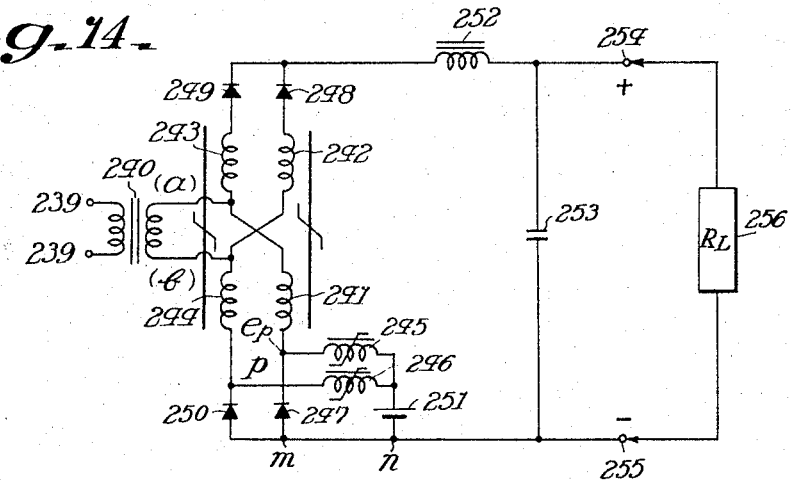
Figure 15A:
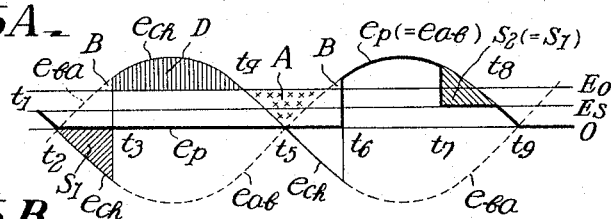
Figure 15B:
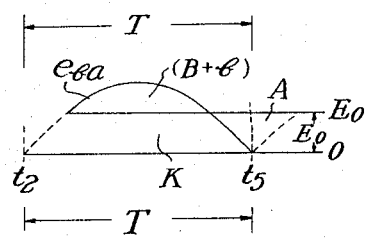

FIGS. 7A, 7B, and 8 are circuit diagrams showing other embodiments of the rectifying apparatus according to the invention applied to half-wave rectification of two-phase A.C. power;

FIG. 9A is a circuit diagram showing an embodiment of the rectifying apparatus according to the invention for full-wave rectification of three-phase A.C. power;

FIG. 9B is an electrical diagram showing a resistance means suitable for insertion in the embodiment shown in FIG. 9A;

FIGS. 10A, 10B, and 10C are waveform diagrams illustrating the operation of the embodiment shown in FIG. 9A;

FIGS. 11, 12A, 12B, 12C, and 13 are circuit diagrams showing a part of other embodiments of the rectifying apparatus according to the invention for use in full-wave rectification of three-phase A.C. power;

FIG. 14 is a circuit diagram showing an embodiment of the rectifying apparatus according to the invention applied to full-wave rectification of single-phase A.C. power; and FIGS. 15A and 15B are waveform diagrams illustrating the operation of the embodiment shown in FIG. 14.

Referring to FIGS. 1 and 2, the application of the present invention to half-wave rectification of two-phase A.C. (single-phase center tap) will first be described. The essential parts of the embodiment shown in FIG. 1 are a power transformer 2 with terminals 1, main rectifiers 10 and 11 connected to the transformer secondary winding; a smoothing capacitor 12, saturable reactors 4 and 5 connected respectively between respetcive power source terminals and the main rectifiers 10 and 11, a series-connected circuit comprising an auxiliary saturable reactor 6 and a controlling D.C. power source 8 connected in parallel with the main rectifier 10, and a series-connected circuit comprising an auxiliary saturable reactor 7 and a controlling D.C. power source 9 and connected in parallel with the main rectifier 11. The D.C. output is supplied to a load 13. Auxiliary saturable reactors 6 and 7 having a magnetizing current (current for causing variation in the magnetic flux) lower than that of the main saturable reactors 4 and 5 are used. The operation of this rectifying circuit may be described with reference to FIG. 2.

In FIG. 2, all the waves illustrated use the potential at the center tap of the secondary winding of the transformer 2 as a reference. A reference symbol $e_a$ designates a curve representing the voltage of the secondary side of the transformer 2. The waveform $e_1$ indicated with a thick full line represents the voltage at the junction between the saturable reactor 4 and the main rectifier 10, and $E_0$ a reference represents the D.C. output voltage. In order to simplify the illustration and description, only the operation of the rectifying circuit including the rectifier 10 is indicated. The capacitance of the smoothing capacitor 12 is sufficiently large, so that the ripple component of the output may be assumed to be negligible. Furthermore, it will be assumed that the forward resistances of the rectifiers are negligible. Since, in the period $t_1$ to $t_3$ as shown in FIG. 2, the voltage $e_a$ is greater than the output voltage $E_0$ and the rectifier 10 is in its conductive state, the voltage $e_1$ is substantially equal to the voltage $E_0$. In a period from $t_0$ to $t_1$ and a period $t_3$ to $t_7$ in each of which the rectifier 10 is cut-off, the A.C. voltage $e_a$, the controlling voltage $E_s$ and the output voltage $E_0$ are applied in a superposed condition to the series-connection which is composed of the main saturable reactor 4 and the auxiliary saturable reactor 6. In the period $t_3$ to $t_5$ in which the auxiliary saturable reactor 6 is not saturated, the voltage $e_1$ becomes equal to the voltage $e_a$. The reason for this is that, since the current flowing through the saturable reactor 4 is the magnetizing current of the auxiliary saturable reactor 6 and is less than the magnetizing current of the saturable reactor 4, the magnetic flux of the auxiliary saturable reactor 6 does not vary, and, therefore, a counter electromotive force is not generated in the saturable reactor 4.

At the instant $t_5$, when the auxiliary saturable reactor 6 becomes saturated, the voltage $e_1$ is equal to the difference between the voltage $E_o$ and the voltage $E_s$ of the controlling D.C. power source 8. This state is maintained throughout the period $t_5$ to $t_6$. As indicated in FIG. 2, during the period $t_0$ to $t_4$ in which the voltage $e_a$ is higher than the voltage $E_o-E_s$, the auxiliary saturable reactor 6 is demagnetized by voltage represented by an area B shaded with vertical hatching and, in the period $t_4$ to $t_5$, the flux is reset in the saturable reactor 4. The area B is equal to the voltage-time integral (integral of the voltage within a certain interval in the voltage waveform plotted on the time axis) corresponding to the area B shaded with horizontal hatching in the period $t_4$ to $t_6$ in which the voltage $e_a$ drops below the voltage $E_o-E_s$. Consequently, the voltage-time integral for resetting flux in the saturable reactor 4 is reset is equal to the area A of the figure shaded by diagonal hatching sloping downwardly to the right in the period $t_5$ to $t_6$. By this resetting, the saturable reactor 4 suppresses the flow of the current to be rectified by a quantity equal to the voltage-time integral corresponding to the area A which is shaded in FIG. 2 with diagonal hatching sloping upwardly to the right in the period $t_7$ to $t_8$. Accordingly, the amount of the rectified current corresponds to an area C in the period $t_8$ to $t_9$. Since, as a characteristic of saturable reactors, the resetting voltage-time integral and the suppressing voltage-time integral are equal, the following relationship is valid.

$$C=K-A-D \qquad (1)$$

where K is the voltage-time integral of a half cycle of the A.C. waveform and is the area enclosed between the zero line and the line indicating the voltage $e_a$ and D is an area enclosed by the waveform $e$ and zero line in the period in which the voltage $e_a$ is positive. Furthermore, if, in the period when $e_a<0$, an area enclosed between the zero line and the line indicating the voltage $(E_o-E_s)$ is denoted by $e$ and the voltage-time integral of one half cycle of the voltage $E_1$ (an area indicated by vertical hatching or indicated by horizontal hatching) is denoted by B, the following relationship will be valid.

$$A=K-B-E \qquad (2)$$

If, within the area $BP_0$ to $P_4$ a part between the zero line and the line indicating the voltage $(E_o-E_s)$ is denoted by F, then $$B=D+F \qquad (3)$$

From Equations 1, 2, and 3, the following equation can be derived.

$$C=E+F \qquad (4)$$

It is assumed that an area $(E+F)$ is equal to a voltage-time integral of the difference $(E_o-E_s)$ for a cycle period T (i.e., $t_0$ to $t_6$) of the A.C. to be rectified. Accordingly, the Equation 4 can be transformed into re following equation:

$$C=(E_s-E_o)T \qquad (4a)$$

On the other hand, a magnitude corresponding to a quotient of an area C divided by a resistor $r$, which is mainly constructed with resistances of windings included in the transformer 2 and the main saturable reactor 4, is equal to a quantity Q of rectified electricity. This relation is represented by the following equation:

$$Q=C/r \qquad (4b)$$

This Equation 4b can be transformed by the use of the Equation 4a into the following equation:

$$Q=(E_s-E_o)T/r \qquad (4c)$$

Moreover, the circuit including the main saturable reactor 5 operates in a similar manner but with a phase difference of the half-cycle period of the input A.C. Therefore, a quantity of rectified electricity in a cycle period of the A.C. is equal to twice the quantity Q shown in the Equation 4c. This quantity 2Q is to be equal to a power consumed in the load 13. Accordingly, the following relation is valid.

$$2Q=2(E_s-E_o)T/r=(E_o/RL)T \qquad (4d)$$

Then, $$E_o-2RL \cdot E_s/(r+2RL) \qquad (4e)$$

As will be understood from the above Equation 4e, the output voltage $E_o$ has no relation to the A.C. voltage. Further, in the rectifying circuits, a ratio of the resistance $r$ to the resistance R is lower than one tenth so that the output voltage $E_o$ becomes a value substantially equal to the controlling voltage $E_s$.

FIG. 3 is a circuit diagram indicating another embodiment of the invention wherein a choke coil 29 is connected in the rectifying circuit of the circuit shown in FIG. 1 to form a choke-input type smoothing circuit. FIGS. 4A and B show voltage waveforms illustrating the operation of the circuit of FIG. 3, and FIG. 4C indicates the characteristic of the current flowing through the choke coil 29. A summary description of the operation of the circuit of FIG. 3 and a description of the operation of the saturable reactors will now be presented below with reference to FIG. 4A and FIG. 4B, respectively.

The waveforms $e_a$ and $e_b$ (thin full lines) indicate respectively the secondary side voltages of a power transformer 15 in the case when the potential of the intermediate tap 17 of a transformer T is used as reference. By the waveform $e_{ch}$ shown as a thick full line, it is indicated that the current to be rectified is supplied from the terminal 16 of the transformer 15 in the period $t_2$ to $t_4$ and the terminal 18 in the period from $t_4$ to $t_8$. In the period $t_1$ to $t_2$ (or the periods $t_3$ to $t_4$ or $t_7$ to $t_8$), the current to be rectified continues to flow until the voltage reaches the negative region. The reason for this is that, since the entrance of the current to be rectified into this circuit is obstructed by the suppressive action of the saturable reactor 19, even if the voltage $e_a$ assumes a higher potential than the voltage $e_b$, the current to be rectified is caused by the operation of the choke coil CH to continue to flow into the circuit of the voltage $e_b$. At the instant $t_2$, when the saturable reactor 19 becomes to the saturated condition and loses its suppressive action, the current to be rectified abruptly shifts to the circuit of the voltage $e_a$. A similar operation occurs in the period $t_3$ to $t_4$ also with regard to the circuit of the voltage $e_a$ so that the voltage across the terminal 17 and the D.C. output terminal 28 becomes the voltage $e_{ch}$ shown by the thick full line.

This voltage $e_{ch}$ is the sum of the terminal voltage of the choke coil 29 and the output D.C. voltage, but since it is improbable that the terminal voltage of the choke coil 29 will contain any D.C. component if the drop in voltage due to the resistance component of the coil 29 is negligible, the mean value of the above-mentioned voltage $e_{ch}$ becomes the output D.C. voltage $E_o$. In other words, the output D.C. voltage $E_o$ is so determined that an area in which the voltage $e_{ch}$ exceeds the voltage $E_o$ becomes equal to an area in which the voltage $e_{ch}$ becomes lower than the voltage $E_o$. In FIG. 4A, the area C corresponding to these two time-integral are indicated by cross (X) marks. Accordingly, if the area A indicated by diagonal hatching sloping upwardly to the right is varied, the mean value of the voltage $e_{ch}$ will vary. Therefore, it is possible to control the D.C. output voltage $E_o$.

In FIG. 4B, the potential of the output terminal 28 is used as reference (indicated by the "0" level), and the relationships with respect to voltages of the circuit are represented for the purpose of describing the operation of the saturable reactors. In the period $t_2$ to $t_4$ wherein the rectifying circuit including the saturable reactor 19 and the rectifier 25 is conductive, the potential of the terminal 16 is the same as that of the terminal 28, and, in the period $t_4$ to $t_8$, the rectifying circuit including the saturable reactor 20 and the rectifier 26 is conductive. Therefore, the voltage across the terminals 16 and 18 of the transformer appears at the terminal 16 as is indicated by the thin full line $e_a$ in FIG. 4B. The intermittent line indicates the potential of the terminal 18. The thick line $e_1$ is a waveform indicating the potential of the junction 27 between the saturable reactor 19 and the auxiliary saturable reactor 21.

For example, in the period $t_1$ to $t_4$, since the rectifier 25 is conductive, the potential $e_1$ at this time becomes the same as the potential of the terminal 28. (In the period $t_1$ to $t_2$, the difference between the magnetizing currents of the saturable reactor 19 and the auxiliary saturable reactor 21 flows by way of the rectifier 25.) In this case, the magnetic flux of the auxiliary saturable reactor 21 is reset during the period $t_0$ to $t_4$ by the voltage $E_s$ of controlling D.C. power source 23 by a quantity equivalent to the voltage-time integral corresponding to the area B with vertical hatching in FIG. 4B. When the instant $t_4$ is reached, the current to be rectified abruptly shifts to the recifying circuit including the rectifier 26, the potential of the terminal 18 becomes equal to the potential of the output terminals 28, and the rectifier 25 assumes a cut-off state up to the instant $t_7$. In the period $t_4$ to $t_6$, although a voltage which is the difference between the voltage $e_a$ and the voltage $E_s$ becomes impressed on the series-connection circuit composed of the saturable reactor 19 and the auxiliary saturable reactor 21. If the magnetizing current of the auxiliary saturable reactor 21 is caused to be less than that of the saturable reactor 19, the auxiliary saturable reactor 21 will be magnetized up to the instant $t_5$ and will be subjected to a variation of magnetic flux corresponding to the area B with horizontal hatching in FIG. 4B (this area B being equal to the afore-mentioned resetting voltage-time integral B indicated by vertical hatching). During this period $t_4$ to $t_5$, the magnetic flux of the saturable ractor 19 does not vary. At the instant $t_5$, the auxiliary saturable reactor 21 is saturated, and thereafter, up to the instant $t_6$ the magnetic flux of the saturable reactor 19 is reset by a quantity corresponding to the area A with diagonal hatching sloping downwardly to the right. In the period $t_7$ to $t_8$, the saturable reactor 19 again carries out suppression corresponding to the area A with diagonal hatching sloping upwardly to the right, but this area A is equal to the resetting voltage-time integral A of the saturable reactor 19 in the period $t_5$ to $t_6$.

Although the above description has been concerned with the operation of the saturable reactor 19 and the auxiliary saturable reactor 21, the same operation is repeated, also, with merely the difference of a phase difference of $\pi$ radius with respect to the saturable reactor 20 and the auxiliary saturable reactor 22.

As a result of the above-described operation, a current $i$ as shown in FIG. 4C flows in the choke coil 29, and a constant current $I_0$ is caused by the smoothing effect of the smoothing capacitor 20 to be supplied to the load 31 (when the load is constant).

Next, the relationship between the controlling D.C. voltage $E_s$ and D.C. output voltage $E_0$ is described below with reference to FIGS. 4A and 4B.

First, consideration of the relationships of the various areas A, C, D, E, G (figure shaded with dots), and the voltage time integral K of a half cycle of the A.C. voltage across the terminals 16 and 17 leads to the following two equations.

$$A = C + D - E \quad (5)$$
$$G = K - C - D + E \quad (6)$$

From Equations 5 and 6, the following equation is obtained.

$$K = G + A \quad (7)$$

Then, by denoting (in FIG. 4B) the area enclosed by the "0" level, the voltage $E_s$ and the voltage $e_a$ in the period $t_4$ to $t_7$ as F, and denoting that the voltage time integral of a halfcycle ($t_4$ to $t_8$) of the A.C. voltage across the terminals 16 and 18, is as 2K, the following equation is obtained.

$$2K = 2A + B + F \quad (8)$$

Here, the area $(B+F)$ is the sum of the area B with vertical hatching and the area F and is equal to the product $E_s \cdot T$. Therefore, $$2K = 2A + E_s \cdot T \quad (9)$$

where T is the period of one cycle of the A.C. power.

Then from Equations 7 and 9, the following equation is obtained.

$$G = (E_s \cdot T)/2 \quad (10)$$

Since the area G, as expressed in terms of the output D.C. voltage $E_0$ becomes $(E_s \cdot T)/2$, the final result is $$E_0 = E_s \quad (11)$$

That is; in the rectifying circuit shown in FIG. 3, the D.C. output voltage $E_0$ is determined solely by the controlling D.C. voltage $E_s$ and is completely independent of the quantity K which is proportional to the voltage of A.C. Accordingly, the D.C. output voltage $E_0$ can be maintained at a constant voltage value even if the input A.C. voltage fluctuates.

The lower limit of the input A.C. voltage necessary for maintaining the D.C. output voltage $E_0$ equal to the controlling D.C. voltage $E_s$ is determined by the condition $2K/T = E_s$. Under this condition, the suppressing voltage-time integral in FIGS. 4A and B becomes zero. On the contrary, there is no limit to the maximum value of the input A.C. voltage, the area A merely increases. As described above, the rectifying circuit of FIG. 3 has the advantageous feature of responding to a wide range of fluctuations of the input A.C. voltage.

While, fundamental embodiments of the present invention, two-phase half-wave rectifying circuits of the capacitor-input type and the choke-input type have been described in the foregoing disclosure, the invention can be applied also to polyphase A.C. power. As examples of such application, the circuitry for rectification of three-phase A.C. power is illustrated in FIGS. 5 and 6

Figure 5:
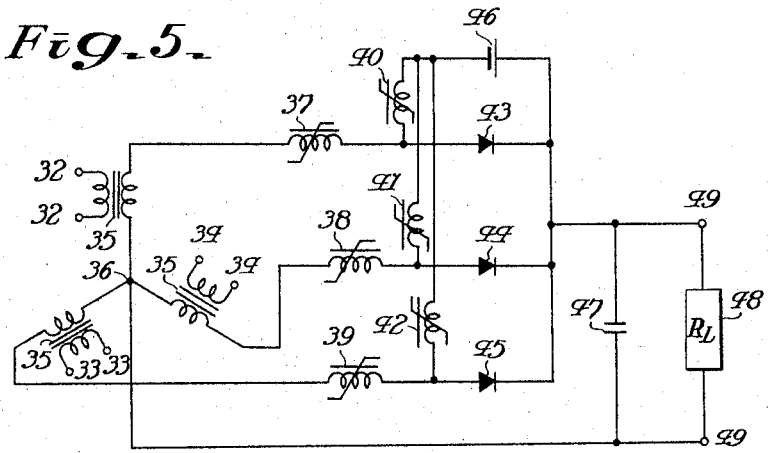
FIGS. 5 and 6 are circuit diagrams showing embodiments of the rectifying apparatus according to the invention applied to half-wave rectification of three-phase A.C. power.
Figure 6:
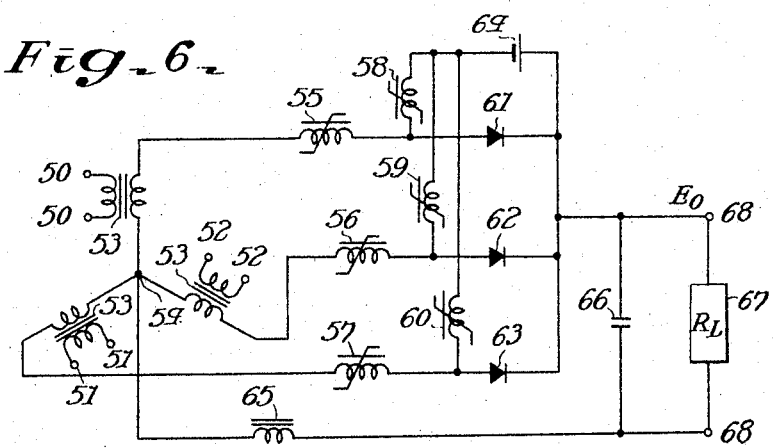

In the circuit of FIG. 5 and FIG. 6 the principal components are a power transformer 35 (53 in FIG. 6), saturable reactors 37, 38 and 39 (55, 56, and 57 in FIG. 6), and auxiliary saturable reactors 40, 41 and 42 (58, 59, and 60 in FIG. 6). A common controlling D.C. power source 46 (64 in FIG. 6) is used for controlling all phases. Detailed description of the operation of these circuits will be omitted here since this operation may be readily understood by analogy with the description as set forth hereinbefore, the only difference being that, whereas in the case of the embodiments of FIGS. 1 and 3 the rectifying operation involves a phase difference of $\pi$ radian, each of the embodiments of FIGS. 5 and 6 operates with a mutual phase difference of $2\pi/3$ radian to one another.

In a rectifying circuit according to this invention, the D.C. output voltage $E_0$ can be utilized as a component of the controlling D.C. voltage $E_s$. One example embodiment for such operation is shown in FIG. 7A. In this embodiment, the circuit is of a form wherein a D.C. power source 77 ($E_t$) is connected in series with the D.C. output voltage $E_0$, and the controlling D.C. voltage $E_s$ in the above-described embodiments corresponds to the voltage sum $(E_0 + E_t)$ in the instant embodiment of FIG. 7A. This D.C. power source 77 may be considered to be a power source for compensating the voltage drop due to the resistance component of the rectifying circuit. On the other hand, however, it is possible to control the D.C. output voltage $E_0$ by adjusting this voltage $E_t$. In other words, if the D.C. voltage $E_t$ is determined, the output voltage $E_0$ settles at a value such that the voltage drop of the rectifying circuit due to the load current become substantially equal to this voltage $E_t$. Since this D.C. voltage $E_t$ can be of an extremely low value relative to the D.C. output voltage $E_o$, control of a high D.C. output voltage by means of a low control voltage becomes possible. For example, it is possible, by utilizing the emitter voltage of a transistor 91 as the D.C. voltage source as indicated in FIG. 7B, to control an output D.C. voltage being several tens of volts up to several hundreds of volts.

FIG. 8 shows an embodiment of the invention wherein a main rectifying circuit consisting of a transformer 103 having input terminals 102, rectifiers 105 and 106, and other components is made controllable by utilizing the output voltages of pulse transformers 109 and 110 added to the rectifying circuit. The rectifiers 105 and 106 are rectifiers with control grids such as thyratrons or SCRs (silicon controlled rectifiers) which become conductive when a pulse is impressed on the control electrode.

Considering the control circuit, at first, the operations of such components as the saturable reactors 107 and 108 and the auxiliary saturable reactors 111 and 112 are similar to those in the embodiment of FIG. 3 described with reference to FIG. 4. If the pulse voltage, due to the abrupt increase in the rectified current at the instant when the saturable reactor 19 (or 20) reaches saturation and causes the start of the conductive state, is obtained from the pulse transformer 109 (or 110) and is utilized to cause the rectifier 105 (or 106) to become conductive, the operation of the rectifying circuit consisting of the power transformer 103, the rectifiers 105 and 106, the choke coil 119, and other parts becomes exactly the same as that in the case indicated in FIG. 4A. In other words, the controlling D.C. voltage $E_s$ and the output D.C. voltage $E_o$ have the following relationship.

$$E_o = kE_s$$

where $k$ is equal to the secondary voltage of the transformer 103 divided by the secondary voltage of the transformer 104. By using a design causing the value of $k$ to be large, the manufacture of a rectifying aparatus for producing constant voltage, which has a high power cacapacity and is controllable by means of a low-power control circuit, becomes readily possible.

In the above-described embodiments, when the load current is constant, a constant D.C. output voltage is obtained as described in detail in each case. Practically, however, since the D.C. resistances of the various component elements of the rectifying circuit cannot be negligible, fluctuations in the output D.C. voltage occurring when the load current fluctuates cannot be avoided, and compensation therefor is difficult. Furthermore, there is also the disadvantage such as increase of the number of controlling D.C. power sources and of auxiliary saturable reactors in the case wherein, as described above, the rectifying circuit is adopted, unmodified, for fullwave rectification (bridge rectifying circuit) of A.C. power.

These difficult problems have been solved in the various embodiments of the invention to be described hereinafter. Briefly and generally described, each of these embodiments is a rectifying apparatus of the type wherein saturable reactors are connected in series to the main rectifiers of a bridge rectifying circuit, and in which, moreover, a series circuit consisting of an auxiliary saturable reactor and a control power source is connected in parallel to each of the rectifiers associated with either of the positive and negative output terminals, whereby the resetting of the saturable reactors associated with these rectifiers is accomplished, and the voltages generated in these saturable reactors are utilized to reset the saturable reactors associated with the other output terminal. In a rectifying apparatus of such arrangement, it is possible to maintain the D.C. output voltage at a constant value in spite of fluctuations in the A.C. voltage and, moreover to eliminate almost completely fluctuations in the D.C. output voltage with respect to fluctuations in the load current. Descriptions in greater detail of these embodiments are presented in order below.

FIG. 9A illustrates a circuit for full-wave rectification of three-phase A.C. A three-phase, bridge rectifying circuit is formed by respectively connecting main rectifiers 138, 139, 140 and 128, 129, 130, by way of saturable reactors 135, 136, 137 and 125, 126, 127, respectively, to secondary side terminals $a$, $b$, $c$, of a power transformer 124 having input terminals 122. A choke coil 147 and a smoothing capacitor 148 are employed similarly as in the aforedescribed embodiments.

For performing the resetting of the saturable reactor 125, a series circuit consisting of an auxiliary saturable reactor 131 and a controlling D.C. power source 134 is connected in parallel with the rectifier 128. An auxiliary rectifier 141 is inserted between the junction 144 of the saturable reactor 135 and of the rectifier 138, and the negative (—) output terminal 150, whereby the reset of the saturable reactor 135 is carried out by impressing thereon a voltage which is generated during the suppression period of the saturable reactor 125. The connections of the respective circuits for the phases of the other terminals $b$ and $c$ of the transformer 124 are similar, as shown in FIG. 9A, the controlling D.C. power source 134 being used in common for all phases.

The manner in which the D.C. output voltage can be maintained at a constant value by the above-described arrangement, independent of fluctuations of the A.C. voltage will be apparent from the following description taken in conjunction with FIG. 10. For the sake of simplicity of description, the voltage drop due to the resistance component of the saturable reactors and rectifiers will be considered to be negligible, and the capacitance of the smoothing capacitor will be assumed to be sufficiently large, wherefore the ripple component of the D.C. output voltage $E_o$ will be considered to be negligible.

In FIG. 10A, the thin lines (coinciding in parts thereof with the thick lines) represents the line voltages of the three-phase A.C., and the upper and lower thick lines represent, respectively, the input voltage $e_{ch}$ of the choke coil and the negative (—) terminal voltage $e-$. This coincides with the line voltage of the phase which has become conductive. In other words, at the instant $t_1$, the voltage $e_a$ of the phase "$a$" is lower than the voltage $e_c$ of the phase "$c$." However, while the saturable reactor 125 of the phase "$a$" is producing a suppression effect, the rectifier 130 of the phase "$c$" continues to be in a conductive state. When the instant $t_2$ is reached and the saturable reactor 125 of the phase "$a$" becomes saturated, the current shifts to this phase "$a$," and the voltage $e-$ of the negative (—) output terminal becomes coincident with the voltage of the phase "$a$." At this time, on the positive (+) side, the phase "$b$" is conductive, and the voltage $e_{ch}$ coincides with the voltage $e_b$. When the instant $t_3$ is reached, the voltage of the phase "$c$" begins to exceed the voltage $e_b$ of the phase "$b$," but, because of the suppression effect of the saturable reactor 136 of the phase "$b$," the current continues to flow in the phase "$b$," and, at the instant $t_4$, the current to be rectified shifts to the phase "$c$." The commutation of the current to be rectified between the positive (+) side and the negative (—) side is accomplished in this manner.

Since the current to be rectified shifts to the phase with the highest in an ordinary bridge rectifying circuit without saturable reactors commutation of the current to be rectified occurs at the instants corresponding to the intersections of the waveforms representing the voltages of respective phases. When saturable reactors are used, however, the commutation of the current to be rectified is delayed by a time equal to the period during which the suppression of each of these reactors is effective. Thus, the suppression of the saturable reactor 125 of the phase "$a$" in the period $t_1$ to $t_2$ in FIG. 10A corresponds to the area $S_1$ with diagonal hatching sloping upwardly to the right.

The thick line of FIG. 10B represents the voltage $e_0$ between the upper and lower thick lines of FIG. 10A using the voltage $e-$ indicated by a thick line in FIG. 10A as a standard base and corresponds to the voltage between the negative $(-)$ terminal 150 and the input terminal of the choke coil 147 of the circuit shown in FIG. 9A. The voltages $e_{ca}$, $e_{cb}$, etc., represented by thin lines in FIG. 10B indicate, respectively, the line voltages relative to the phase "c" using the phase "a" and phase "b" as reference. For example, during the period $t_4$ to $t_6$, since the phase "c" is conductive on the positive $(+)$ side, and the phase "a" is conductive on the negative $(-)$ side, the line voltage $e_{ac}$ becomes $e_0$. Since the D.C. output voltage $E_o$ becomes equal to the mean value of the voltage $e_0$ (when the resistance of the choke coil is negligible), the areas $A_1$ and $A_2$ with diagonal hatching sloping downwardly to the right as shown in FIG. 10B are equal to each other. The area of the four-sided figure (one side being a sine curve) designated by the letter F in FIG. 10B may be utilized as follows:

Since
$$A_1 = A_2$$
$$A_1 + F = A_2 + F$$
But
$$A_1 + F = S_1$$
Therefore,
$$A_2 + F = S_1 \quad (12)$$

In other words, an area of the figure with vertical hatching on the right-hand side of FIG. 10B is equal to the area $S_1$ and represents the suppression effect of one of main-saturable reactors. Accordingly, as is apparent from FIG. 10B, it is possible to control the D.C. output voltage by controlling the area $S_1$.

FIG. 10C indicates the resetting operation of the above-mentioned saturable reactors and particularly shows the voltages relating to the saturable reactor 125 of the phase "a." The thick full line represents the power source terminal voltage $e_{a0}$ of the phase "a" with the negative $(-)$ side terminal 150 as reference. In other words, since the phase "c" is conductive on the negative $(-)$ side in the period $t_1$ to $t_2$, the terminal voltage of the phase "a" varies in accordance with the voltage $e_{ca}$. At the instant $t_2$, since the phase "a" becomes connected to the negative $(-)$ side, the voltage $e_{a0}$ is zero in the period $t_2$ to $t_6$. After the instant $t_6$, since the negative $(-)$ side current is shifted to the phase "b," the voltage $e_{a0}$ becomes equal to the voltage $e_{ba}$ in the period $t_0$ to $t_{10}$. Then, in the period $t_{10}$ to $t_{14}$, since the conductive state of the negative $(-)$ side is shifted to the phase "c," the voltage $e_{a0}$ becomes equal to the voltage $e_{ca}$, and after the instant $t_{14}$, the operation returns to the state as to the instant $t_2$. The period during which the voltage $e_{a0}$ is negative is that during which the saturable reactor 125 is producing suppression effect, but also during this period, the rectifier 128 is in a conductive state and is permitting the flow therethrough of the magnetizing current of the saturable reactor 125. Consequently, the potential of the junction between the saturable reactor 125 and the rectifier 128 is zero.

In the period during which the voltage of the junction between the saturable reactor 125 and the rectifier 128 is lower than the voltage $E_s$ (indicated by an intermittent line in FIG. 10C) of the controlling D.C. power source 134, the auxiliary saturable reactor 131 is reset by the voltage $E_s$. The voltage-time integral during this period is equal to an area formed by cutting off the waveform of the voltage $e_{a0}$ with the voltage $E_s$ and the zero line in the period $t_a$ to $t_6$. Then, in the period $t_6$ to $t_b$ in which the voltage $e_{a0}$ is higher than the voltage $E_s$, the difference between these voltages is impressed on the series-connected circuit of the saturable reactor 125 and the auxiliary saturable reactor 131. If the magnetizing current of the latter (131) is less than that of the former (125), the resetting of the saturable reactor 125 will be accomplished only after the auxiliary saturable reactor 131 is in a saturated state. In other words, the difference obtained by subtracting the resetting voltage-time integral of the auxiliary saturable reactor 131 from the area within which the voltage $e_{a0}$ exceeds the voltage $E_s$ becomes the resetting voltage-time integral of the saturable reactor 125.

If, for the sake of convenience in the present consideration, it is considered that $B_2$ indicated with diagonal hatching sloping upwardly to the right in FIG. 10C is added to the voltage-time integral of the voltage $e_{a0}$ in the period $t_6$ to $t_{13}$, the area resulting from combining one part thereof (the part above the voltage $E_o$) and the area of the part designated by the letter D is equal to the area $A_2$, and this area can be substituted for the part designated by $A_3$. Moreover, the area $A_2$ is equal to the area $A_1$. On the other hand, the aforesaid area $B_2$ is equal to the area $B_1$ in the period $t_6$ to $t_7$. This is because the area $B_1$ is a time integral of the voltage $e_{ac}$ in the period $t_6$ to $t_7$, and the area $B_2$ relates to the difference between the voltage $e_{bc}$ and the voltage $e_{ba}$, which difference is, the voltage-time integral of the voltage $e_{ac}$ in the same period. Accordingly, if the area of the part wherein the voltage $e_{a0}$ becomes positive is denoted by $A_a$, the following relation will be valid, because the area of four-sided figure enclosed by the voltage $E_o$, the zero line, the voltage $e_{ac}$ and the voltage $e_{ca}$ is equal to $E_o.T$.

$$A_a + B_2 = E_o.T + B_1 + C$$
Therefore,
$$A_a = E_o.T + C \quad (13)$$

The quantity by which the saturable reactor 125 is reset is equal to the difference obtained by subtracting, from this area $A_a$, the part lower than the voltage $E_s$ and the afore-mentioned resetting voltage-time integral of the auxiliary saturable reactor 131. Since the sum of these areas becomes $E_s.(2T)$, the resetting voltage-time integral of the saturable reactor 125 will be equal to the area C according to Equation 13 if the voltage $E_s$ is equal to one half of the voltage $E_o$. The saturable reactor 125 produces suppression effect, in the period $t_{13}$ to $t_{14}$, by a quantity equal to this resetting quantity C.

While in the above consideration the resetting of the saturable reactor 125 of the phase "a" has been described, the same resetting operation is accomplished also in the case of the saturable reactors 126 and 127 of the other phases. On another hand, during the period in which the voltage $e_{a0}$ is negative, the rectifier 141 becomes conductive, and the suppression voltage of the saturable reactor 125 is impressed directly, as it is, on the saturable reactor 135, thereby this reactor 135 is reset. The saturable reactors 136 and 137 of another phase are also reset in a similar manner by resetting voltages impressed by way of the rectifiers 142 and 143, respectively. As an ultimate result, the saturable reactors of all phases are reset in a similar manner and produce similar suppression effects, then such a rectification operation as is indicated in FIGS. 10A and 10B is accomplished. As has been described in connection with FIG. 10B, the rectified output voltage is determined by the suppression effect (the quantity of which is indicated by $S_1$ or C) of the main saturable reactors. However, as is apparent from the description given in connection with FIG. 10C, the resetting voltage-time integral (area $S_1$) is so determined that the D.C. output voltage $E_o$ will be twice the controlling D.C. voltage $E_s$. In other words, in the rectifying circuit of FIG. 9A, even if the A.C. voltage fluctuates, the saturable reactors are so reset that the D.C. output voltage $E_o$ becomes twice the controlling D.C. voltage $E_s$, and an extremely stable D.C. output voltage is obtained.

The above-described embodiment has, in addition to the advantage of being operable with a controlling D.C. voltage which is only one half of the output voltage, the advantage of being constructable in an extremely simple manner a constant-voltage-output rectifying apparatus. The reason for this advantage is that, since this controlling D.C. voltage is of the same polarity as the D.C. output voltage, a portion of the D.C. output voltage can be easily utilized to generate the controlling D.C. voltage, for example, by using a resistance and a constant-voltage diode.

Furthermore, the embodiment illustrated in FIG. 9A has the great advantage of being capable of maintaining the fluctuation of the D.C. output voltage at a small value or at zero value with respect to fluctuations in the load current. In general, in a rectifier, there exists a resistance component, and a certain drop in the D.C. output voltage caused in accordance with increase of the load current cannot be avoided. In the instant embodiment however, it is possible to construct, by utilizing such characteristic of the present embodiment that the D.C. voltage substantially equal to twice the controlling D.C. voltage is obtainable, a rectifying apparatus wherein there is no fluctuation of the D.C. output voltage accompanying the fluctuation in the load current. For example, a resistance 152 having a low resistance value as illustrated in FIG. 9B may be inserted between the terminals designated by the letters $m$ and $n$ in the circuit of FIG. 9A. Then, the voltage drop across this resistance 152 has the effect of an increase in the controlling D.C. voltage, and the D.C. output voltage increases by a quantity equal to twice the voltage drop. As a net result, the voltage supplied to the load increases by a voltage equal to the voltage drop across the resistance. Since this increase is proportional to variation of the load current, if this increase is equal to variation of the voltage drop, based on increase of load current of the rectifiers and other components, the voltage supplied to the load can be maintained in an extremely stable state with respect also to fluctuations in the load current.

In actual practice, it is possible, by adjusting the resistance value of the resistance 152, to obtain the optimum value for compensating for the voltage drop. Alternatively, it is possible also to obtain a similar effect by utilizing the resistance of such a component as a choke coil or a saturable reactor in place of the above-mentioned inserted resistance. Actually, since the voltage drop due to the resistance of the saturable reactors 125, 126, and 127 and the rectifiers 128, 129, and 130 acts as increase of the controlling D.C. voltage $E_s$ with respect to the phase to be subjected to resetting, the circuit of FIG. 9A, in its unchanged form as shown, has the tendency to eliminate any worsening, due to resistances of the saturable reactors and rectifiers, of the voltage regulation. In the circuit of FIG. 9A, however, the influence of the resistance of the saturable reactors remains to a certain degree. This influence is such that, for example, when the phase "$a$" is conductive on the negative ($-$) side, a voltage drop is created in the saturable reactor 125 and the rectifier 128, and thus this voltage drop causes, through the rectifier 141, the resetting voltage-time integral of the saturable reactor 135 to increase. Since the same effect is exhibited also in the case of the saturable reactors 136 and 137 of the other phase, the suppression voltage-time integrals on the positive ($+$) side of FIG. 10A are larger than those on the negative ($-$) side. In other words, the suppression voltage-time integrals of the saturable reactors 135, 136, and 137 become greater than the suppression voltage-time integral of the saturable reactors 125, 126, and 127. Described in connection with FIG. 10B, every other area of suppression becomes large. Consequently, the D.C. output voltage $E_o$ drops by quantity corresponding to the increase of this suppression quantity. Since this voltage drop is proportional to the load current, the voltage regulation is adversely affected.

Figure 11:
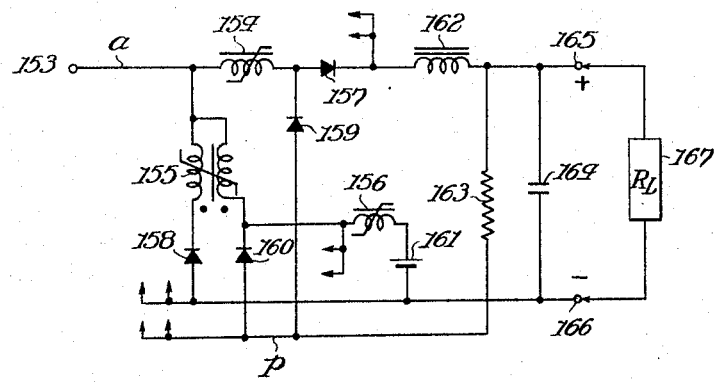

The circuit of an embodiment designed to solve the above-described problem, which is a modification of the embodiment of FIG. 9A, is shown in FIG. 11. This circuit diagram, for the sake of simplicity, indicates parts associated with only one phase, the parts associated with the other phases being omitted except for arrows indicating respective connections to the other phases. The principal point of modification is the provision of a secondary winding (which may be of thin wire) in a saturable reactor 155. The voltage generated in this secondary winding is conducted, by way of an auxiliary rectifier 160, to a junction $p$ which is common to all phases. This voltage is employed, by way of a rectifier 159, to accomplish resetting of a saturable reactor 154. A resistance 163 is used for supplying bias current to the rectifier 160.

The operation of the above-described rectifying circuit is described below in detail. While the saturable reactor 155 of the phase "$a$" is saturated, the voltage of its secondary winding is also zero, and the voltage of the point $p$ is higher than that of the point $a$ by a voltage equal to the forward voltage of the rectifier 160. However, since this voltage is cancelled due to the voltage drop of the rectifier 159, unnecessary resetting of the saturable reactor 154 is prevented. Accordingly, the afore-mentioned influence of the voltage drop due to the current to be rectified in the saturable reactor 155 can be eliminated. Since, in the suppression period of the saturable reactor 155, its voltage appears also at the secondary side, this voltage, acting through the rectifiers 159 and 160, resets the saturable reactor 154. While at the point $p$, suppression voltages of the other phases appear, the potential of the point "$a$" is high in this case, so that the operation is not affected by the influences of the other phases. The negative ($-$) terminal 166 is at a higher potential than the point "$p$" by a quantity equivalent to the voltage drop due to resistances of the saturable reactor 155 and the rectifier 158. Since this difference of potential is added to the voltage $E_s$ of the D.C. control power source 161 to accomplish resetting of the saturable reactors 156 and 155, the value of the voltage $E_o$ of FIG. 10C increases by twice the voltage drop of the saturable reactor 155 and the rectifier 158. If, on account of this increase of the voltage $E_o$, the said voltage drop and the voltage drop of the saturable reactor 154 and the rectifier 158 (assumed to be equal to the voltage drop on the side of the saturable reactor 155 and the rectifier 158) are subtracted, a voltage equal to $2E_s$ will appear on the input side of the choke coil 162, and thus the influence of the resistance of the saturable reactors and rectifiers can be eliminated.

Another modification of the embodiment of FIG. 9A is illustrated in FIG. 12. This circuit is suitable for high-voltage rectification and the like. This diagram also shows the parts associated with only one phase and shows arrows indicating connections with the parts associated with the other phases. The power transformer 169 is provided with a tertiary winding (which may be replaced by a separate transformer), which is connected to an auxiliary rectifying circuit comprising secondary windings provided on saturable reactors 170 and 171, auxiliary rectifiers 177 and 176, an auxiliary choke coil 179, a smoothing capacitor 180, a load 181, and other components. This auxiliary rectifying circuit is controlled to produce constant voltage, in the same manner as in the case of the embodiment of FIG. 9, by means of an auxiliary saturable reactor 172, a controlling D.C. power source 178, and a rectifier 175. The composition of the main rectifying circuit is the same as that in the case of the embodiment of FIG. 9A but the main rectifying circuit is controlled indirectly by the above-described auxiliary rectifying circuit.

If the voltage ratio of the secondary winding to the tertiary winding of the transformer 169 is made to equal the turn ratio of the primary to secondary windings of the saturable reactors 170 and 171, and if this ratio is represented by $n:1$, a voltage which is $n$ times the voltage of the secondary side will be generated on the primary side of each of the saturable reactors 170 and 171. Accordingly, the operation will be the same as that in the case of the embodiment of FIG. 9A, and a D.C. output voltage which substantially equal to $n$ times the rectified output voltage of the auxiliary rectifying circuit will be generated. In this case, however, although the D.C. output voltage decreases, in accordance with an increase in the load current, by a quantity equal to the voltage drop due to the resistance of the main rectifying circuit, this decrease in output voltage can be cancelled by causing a compensating voltage equal to $1/(2n-1)$ of the voltage drop to be added to the D.C. control voltage $E_s$ as described in connection with FIG. 9A, whereby it is possible to maintain the D.C. output voltage constant in spite of fluctuations of the load current also.

If the turn ratios of the primary to secondary windings of the saturable reactors 170 and 171 are made to be slightly greater than the turn ratio of the secondary to tertiary windings of the power transformer 169, a suppression action which is slightly greater than that of a normal constant-voltage control operation performed in the main rectifying circuit. Accordingly, if the power source voltage increases, the D.C. output voltage will exhibit a tendency to decrease slightly. This character can be utilized in the embodiment of FIG. 9A in order to compensate for such influences that the D.C. voltage decreases very slightly in accordance with increase of the input A.C. voltage whereby a desirable rectifying apparatus for producing constant voltage can be obtained.

Figure 12A:
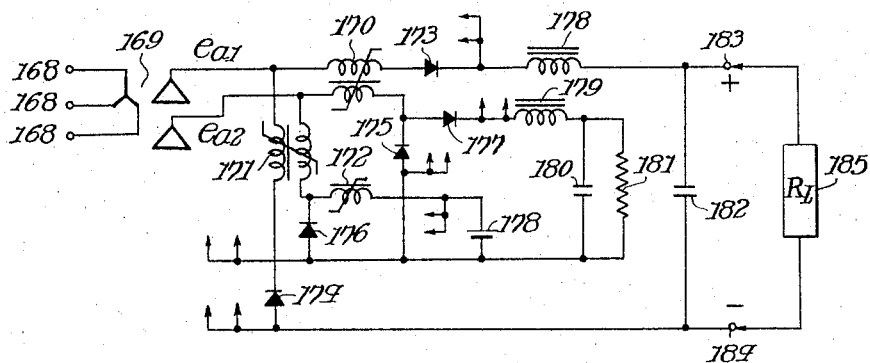
Figure 12B:
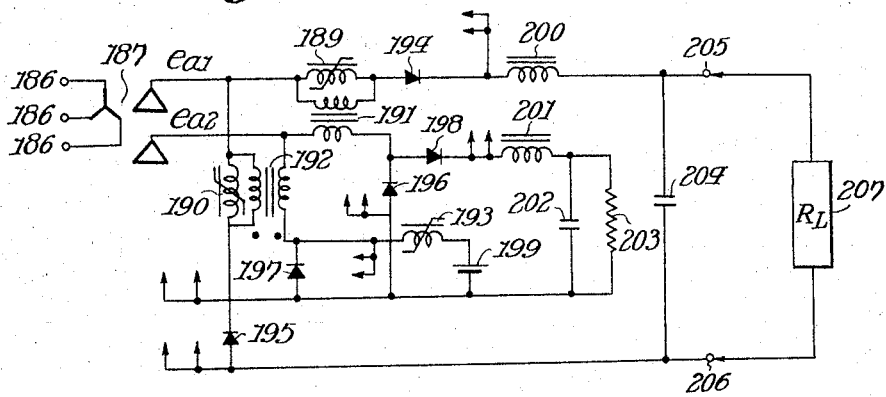
Figure 12C:
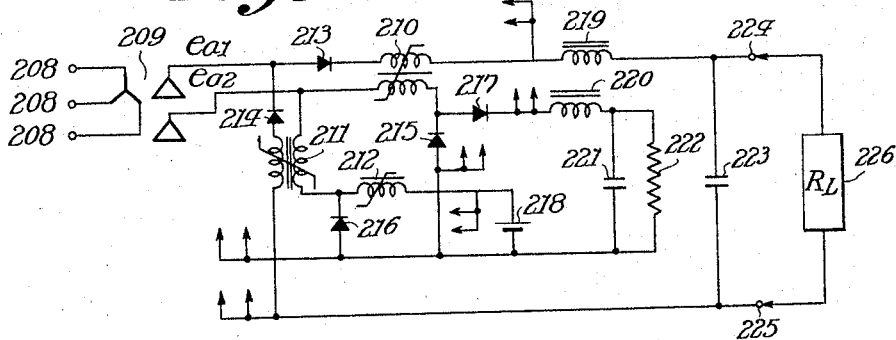
Figure 13:
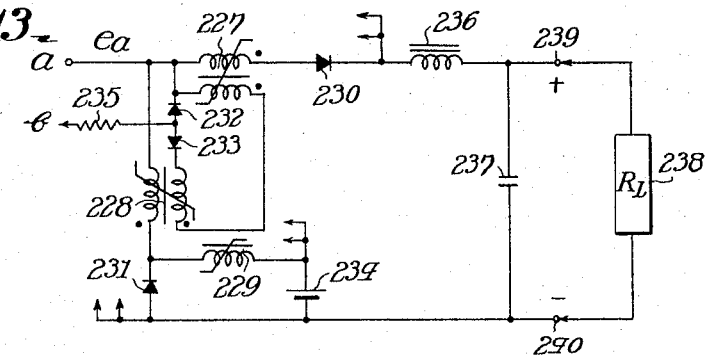

It will be obvious that substantially the same operation as described above can be obtained also by using transformers 191 and 192 to form the afore-mentioned auxiliary rectifying circuit, as indicated in FIG. 12B, instead of providing secondary windings in the saturable reactors. Moreover, a similar constant-voltage characteristic can be obtained also by substituting positions of a saturable reactor 210 and a rectifier 213 to each other and further substituting positions of a saturable reactor 211 and a rectifier 214 to each other as indicated in FIG. 12C.

Still another modification of the embodiment of FIG. 9A is shown in FIG. 13, in which, again, only the parts associated with one phase are shown, and connections to parts associated with the other phases are indicated by arrows. This embodiment of FIG. 13 differs from that of FIG. 9A so that saturable reactors 227 and 228 are provided with secondary windings, which are connected in series by way of rectifiers 232 and 233. A resistance 235 for current limitation is connected to the junction between the rectifiers 232 and 233. This resistance 235 is connected to, for example, the voltage of the antiphase $e_a$ (or the phase "$b$") to maintain the rectifier 232 and 233 in a cut-off state in the period during which the suppression action of the saturable reactor 227 is effective. By this arrangement, when the saturable reactor 227 is in a suppression state, the application of its suppression voltage on the saturable reactor 228 and the resetting thereby of this saturable reactor 228 are prevented. During the suppression period of the saturable reactor 228, the rectifiers 232 and 233 are in conductive states, and the voltage of the saturable reactor 228 is impressed on the saturable reactor 227 to reset the same. Accordingly, the same constant-voltage rectification operation substantially as in the case of the embodiment of FIG. 9A is accomplished. In the instant case, also, it is possible to regulate the variation characteristic of the D.C. output voltage with respect to variations in the input voltage by varying the turn ratios of the primary to secondary windings of the saturable reactors 227 and 228.

The case wherein the present invention is applied to full-wave rectification (bridge rectifying circuit) of single-phase A.C. power is illustrated in FIG. 14. In this circuit, the saturable reactors 241 and 242 and the saturable reactors 243 and 244 respectively consist of double windings on common cores, and only the saturable reactors 241 and 244 are provided with resetting circuits composed of auxiliary saturable reactors 245 and 246 and a controlling D.C. power source 251. The saturable reactors 242 and 243 are reset by the saturable reactors 241 and 244.

The operation of the embodiment of FIG. 14 will now be described with reference to FIG. 15, which is a voltage waveform diagram. In FIG. 15, the thick line represents the voltage $e_p$ of the junction between the saturable reactor 241 and the auxiliary saturable reactor 245 using the negative ($-$) side terminal 255 taken as reference. The thin full line (coinciding in a part thereof with the thick line) indicates the input voltage $e_{ch}$ of the choke coil 252, and the intermittent lines represent, respectively, the terminal voltage $e_{ab}$ of the terminal $b$ with respect to the terminal $a$ of the transformer 240 and the terminal voltage $e_{ba}$ of the opposite phase. The figure $S_1$ with diagonal hatching sloping upwardly to the right indicates the suppression voltage-time integral of the saturable reactor 241 and, at the same time, also the suppression voltage-time integral of the saturable reactor 242. That is, prior to the instant $t_3$, the current to be rectified is flowing continuously through the rectifying circuits of the saturable reactors 243 and 244, wherefore the potential of the input side of the choke coil 252 is coincident with the voltage $e_{ab}$, and the voltage of the terminal $b$ of the power transformer 240 is equal to the voltage of the negative ($-$) side, that is, zero potential. After the time $t_2$ when the voltage $e_{ab}$ becomes negative, the rectifier 248 becomes conductive. In the saturable reactor 242, however, the current to be rectified is suppressed by a quantity equivalent to the previously reset voltage-time integral $S_1$ (to be described hereinafter). In the case of the saturable reactor 241, also, the rectifier 247 becomes conductive in the period during which the voltage $e_{ab}$ becomes negative, but a suppression action similar to that in the saturable reactor 242 is accomplished. After completion of the above-described suppression action, since, at the instant $t_3$, the core of the saturable reactors 241 and 242 reach saturation, the saturable reactors 241 and 242 simultaneously lose their suppression functions, and the current to be rectified is shifted to this rectifying circuit. Consequently, after the instant $t_3$, the input voltage $e_{ch}$ of the choke coil 252 becomes coincident with the voltage $e_{ba}$.

The above-described operation is accomplished in a similar manner for the saturable reactors 243 and 244, and the operational cycle returns to the initial state. Since the mean value of the voltage $e_{ch}$ should appear at the output terminal of the choke coil, the D.C. output voltage $E_o$ is so determined that, in FIG. 15A, the area D with vertical hatching during the period when the voltage $e_{ch}$ exceeds the voltage $E_o$ becomes equal to the area corresponding to the period when the voltage $e_{ch}$ is less than the voltage $E_o$ (sum of the area A shaded with cross (X) marks and the area resulting from the subtraction of the three-sided figure B from twice the area of the figure $S_1$ with diagonal hatching sloping upwardly to the right). That is, $$D = 2S_1 + A - B \qquad (14)$$

In FIG. 15B, which shows one part of FIG. 15A, the semi-parallelogram area $E_o.T$ may be expressed by the following equation by denoting the area of the voltage $e_{ba}$ from the instant $t_2$ to the instant $t_5$ by K.

$$E_o T = K = (B+D) + A \qquad (15)$$

From Equations 14 and 15, the following equation is obtained.

$$E_o T = K - 2S_1 \qquad (16)$$

On the other hand, in the resetting circuit consisting of the auxiliary saturable reactor 245 and the D.C. power source 251 for control, during the period $t_1$ to $t_6$, the auxiliary saturable reactor 245 is reset by a voltage corresponding to the area enclosed by the voltage $e_p$ and the D.C. control voltages $E_s$, and after the instant $t_6$, since the voltage $e_p$ exceeds the voltage $E_s$, the auxiliary saturable reactor 245 proceeds towards saturation. In this case, if the magnetization current of the auxiliary saturable reactor 245 is selected to be less than the magnetization current of the saturable reactor 241, the magnetic flux of the saturable reactor 241 will not undergo variation until the instant $t_7$ at which the auxiliary saturable reactor 245 reaches saturation.

In the period $t_7$ to $t_8$, the saturable reactor 241 is reset by a quantity corresponding to the area $S_2$ with diagonal hatching sloping downwardly to the right by the voltage $e_{ab}$ (coinciding with the voltage $e_{ch}$) which exceeds the controlling D.C. voltage $E_s$. Of course, the saturable reactor 242, which has the same common core, is also reset simultaneously by the saturable reactor 241. This resetting voltage-time integral $S_2$ is equal to the difference obtained by subtracting a sum the voltage-time integral $S_1$ and the time integral of the voltage $e_p$ in the period $t_6$ to $t_9$, from the time integral $K$ of the voltage $e_{ab}$ in the period $t_6$ to $t_9$. In this case, the time integral of the voltage $e_p$ in the period $t_6$ to $t_9$ corresponds to the area $E_s.2$ of a parallelogram with a height $E_s$ and a base $2T$.

$$S_2 = K - S_1 - W_s \cdot 2T \tag{17}$$

Since, under normal conditions, the suppression and resetting voltage-time integrals should be equal, the above equation may be rewritten as follows:

$$E_s.2T = K - 2S_1 \tag{18}$$

Accordingly, from Equations 16 and 18, the following result is obtained.

$$E_o = 2E_s \tag{19}$$

In other words, the instant embodiment of FIG. 14 is a rectifying circuit for producing a constant D.C. output voltage $E_o$ which is indepedent of the A.C. input voltage.

It will be obvious that, in the case of the instant embodiment also, similarly as in the case of the embodiment of FIG. 9A and B, fluctuations in the D.C. output voltage due to load current fluctuations can be compensated for by inserting a resistance means of low resistance value between the terminals designated by "$m$" and "$n$".

While, relative to full-wave rectifying circuits, rectifying circuits of the choke-input type having smoothing circuits have been described, a constant-voltage characteristic can be similarly obtained also in the case of rectifying circuits of the capacitor-input type, similarly as in the case of half-wave rectification.

Although the voltage of said controlling D.C. voltage source employed in each embodiment is described as is assumed to be a constant voltage, a variable D.C. source capable of setting an optional voltage may be employed as such controlling D.C. voltage. In this case, the D.C. output voltage can be set at a desirable value precisely.

In all the aforesaid embodiments, said smoothing circuit is employed for smoothing the rectified output and for obtaining D.C. output having no ripple components. However, if inclusion of said rippel components is allowable in the rectified output, said smoothing circuit can be cancelled in each of the aforesaid embodiments, for example, in such case as the rectification of poly-phase A.C. for supplying high power.

Although the foregoing description has concerned the case in which the A.C. input voltage has a sine waveform, the rectifying circuit according to the present invention is equally effective in the case wherein the A.C. voltage waveform differs from a sine waveform.

Obviously many modifications and variations of the present invention are possible in the light of the above teachings. It is to be understood, therefore, that within the scope of the appended claims the invention may be practiced otherwise than as specifically described.

What we claim is:

1. A rectifying apparatus for developing constant voltage outputs comprising: an alternating current source having terminals, rectifying means comprising series connected circuits, each series circuit comprising a saturable reactor and a rectifier connected in series, each series circuit connected at one end thereof to a corresponding terminal of said alternating-current power source supplying power to be rectified and connected at the other end thereof to a junction common to said series-connected circuits, control means comprising series-connected control circuits each comprising an auxiliary saturable reactor and a direct-current power source, and each control circuit connected in parallel with one of the said rectifiers of said rectifying means for causing the saturable reactors of the said rectifying means to accomplish control of the suppressing phase of the current to be rectified with respect to the alternating-current voltage to be rectified.

2. A rectifying apparatus according to claim 1, including coupling means for deriving a voltage shifted from one of the rectifiers to another and for applying said voltages to the control electrode of a rectifier having a control grid and provided to rectify alternating-current supplied from the same said alternating-current power source to obtain a direct-current output.

3. A rectifying apparatus for developing constant output voltages comprising: an alternating-current power source having terminals, a first rectifying means comprising series-connected circuits each series circuit comprising a saturable reactor and a rectifier connected in series, and each being connected at one end thereof to a corresponding terminal of said alternating-current power source supplying power to be rectified and connected at the other end thereof to a junction common to said series-connected circuits, a second rectifying means comprising series-connected circuits each comprising a saturable reactor and a rectifier connected in series, each series circuit connected at one end thereof to a corresponding terminal of said alternating-current power source supplying power to be rectified and connected at the other end thereof to a junction common to the last mentioned series-connected circuits, the number of said series circuits in said second rectifying means being the same as that of the series-connected circuits of said first rectifying means, a first control means comprising series-connected circuits each comprising an auxiliary saturable reactor and a direct-current power source connected in series, and each of the last mentioned circuits connected in parallel with a respective one of the rectifiers of the said first rectifying means for causing the saturable reactors of the said first rectifying means to accomplish control of the suppressing phase of the current to be rectified with respect to the alternating-current voltage to be rectified, a second control means for impressing the voltage generated in the saturable reactors of said first rectifying means on the saturable reactors of said second rectifying means to cause the saturable reactors of said second rectifying means to control the suppressing phase of the current to be rectified with respect to the alternating-current voltage to be rectified, and an output terminal means for obtaining rectified output at each of said common junctions.

4. A rectifying apparatus according to claim 3, including a resistance means between the direct-current power source of said first control means and the commonly-connected end junction common to the series-connected circuits of said first rectifying means, and the rectified output is obtained through said resistance means.

5. A rectifying apparatus according to claim 3, in which the saturable reactors of said first control means comprise a secondary winding connected at one end thereof to one end of the saturable reactor of the primary side is provided, each of the auxiliary saturable reactors of said first control means is connected to the other end of the said secondary windings, and said second control means comprises two rectifiers connected back-to-back between the junction of the said secondary winding and the auxiliary saturable reactor and the junction of the saturable reactor of the said second rectifying means and its corresponding rectifier.

6. A rectifying apparatus according to claim 3, including for each phase of the alternating current source to be rectified a transformer secondary winding coupled with the saturable reactor of the said first rectifying means and a transformer secondary winding coupled with the saturable reactor of said second saturable reactor, another rectifying means identical with said first rectifying means and another rectifying means identical with the said rectifying means operably connected to said two coupled windings; and rectified current is obtained through the said two other rectifying means.

7. A rectifying apparatus according to claim 6, in which each of said coupled windings is composed of a transformer winding wound on the same core as that of their respective saturable reactors.

8. A rectifying apparatus according to claim 6, in which each of the said coupled windings is composed of secondary winding of a transformer with its primary winding connected to respective ends of the saturable reactor.

9. A rectifying apparatus according to claim 3, including for each phase of alternating current source to be rectified two windings coupled respectively with the saturable reactor of the said first rectifying means and with the saturable reactor of the said second rectifying means, said two coupled windings are mutually connected at one end thereof and are connected at their other ends through two rectifiers which are connected back-to-back; and the said second control means is formed by the impression of a bias voltage on the junction between the said two rectifiers.

10. A rectifying apparatus according to claim 3, in which said second control means comprises a configuration in which the saturable reactor of the said first rectifying means is connected to one terminal of the alternating-current power source supplying power to be rectified and a saturable reactor connected to the other terminal thereof have a common core.

No references cited.

JOHN F. COUCH, *Primary Examiner.*

LLOYD McCOLLUM, *Examiner.*

J. M. THOMSON, M. WACHTELL,
*Assistant Examiners.*